United States Patent [19]

Wilson

[11] Patent Number: 4,890,922

[45] Date of Patent: Jan. 2, 1990

[54] THERMALLY COMPENSATED REFERENCE INTERFEROMETER AND METHOD

[75] Inventor: Keith E. Wilson, Arcadia, Calif.

[73] Assignee: Litton Systems, Inc., Beverly Hills, Calif.

[21] Appl. No.: 316,183

[22] Filed: Feb. 27, 1989

Related U.S. Application Data

[63] Continuation of Ser. No. 17,425, Feb. 20, 1987, abandoned.

[51] Int. Cl.⁴ .................................................. G01B 9/02
[52] U.S. Cl. ....................................... 356/350; 372/32
[58] Field of Search ................ 356/350; 350/400, 404; 372/32

[56] References Cited

U.S. PATENT DOCUMENTS

| | | | |
|---|---|---|---|
| 4,299,490 | 11/1981 | Cahill et al. | 356/350 |
| 4,305,046 | 12/1981 | Le Floch et al. | 350/400 |
| 4,410,275 | 10/1983 | Shaw et al. | 356/350 |

OTHER PUBLICATIONS

Temperature Compensation of Birefringent Optical Filters, Kimura et al., IEEE Proceedings, 8-1971, pp. 1273–1274.

Primary Examiner—Vincent P. McGraw
Assistant Examiner—S. A. Turner
Attorney, Agent, or Firm—Lynn & Lynn

[57] ABSTRACT

A first birefringent material is positioned to receive an optical signal output from an optical source. A second birefringent material is positioned to receive the signal transmitted through the first birefringent material. The birefringence of the first birefringent material is modulated to produce a modulation in the phase difference between two polarizations propagated between the birefringent materials. A detector forms an electrical signal indicative of the phase shift produced by the first and second birefringent materials between a pair of orthogonal polarizations in the optical signal received by the first birefringent material. This phase shift is opposite to phase shifts caused by changes in the source wavelength. A feedback signal indicative of the hase shift caused by the crystals is fed back to the optical source to stabilize its frequency. The system produces a temperature-independent phase shift between the two polarizations by means of proper selection of the lengths of the crystals in the optical path.

18 Claims, 6 Drawing Sheets

THERMALLY COMPENSATED REFERENCE INTERFEROMETER AND METHOD

This is a continuation of copending application Ser. No. 017,425 filed on Feb. 20, 1987, now abandoned.

BACKGROUND OF THE INVENTION

This invention relates generally to apparatus and methods for controlling the frequency of light output from an optical signal source. This invention is particularly related to apparatus and methods for controlling the frequency of optical signals output from coherent light sources. Still more particularly this invention relates to apparatus and methods for controlling the frequency output from an optical signal source used in a fiber optic rotation sensing system to stabilize the scale factor that relates the Sagnac phase shift to the rotation rate.

A fiber optic ring interferometer typically comprises a loop of fiber optic material having counter-propagating light waves therein. After traversing the loop, the counter-propagating waves are combined so that they constructively or destructively interfere to form an optical output signal. The intensity of the optical output signal varies as a function of the type and amount of interference, which is dependent upon the relative phase of the counter-propagating waves.

Fiber optic ring interferometers are particularly useful for sensing rotations. Rotation of the loop creates relative phase difference between the counter-propagating waves, in accordance with the Sagnac effect, with the amount of phase difference being a function of the angular velocity of the loop. The optical output signal produced by the interference of the counter-propagating waves varies in intensity as a function of the rotation rate of the loop. Rotation sensing is accomplished by detecting the optical output signal and processing the optical output signal to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper limit lower limits to be measured is approximately $10^9$.

The development and practical implementation of rotation sensing systems using optical signals require stability in the optical pulses input to the optical fibers. Optical sensing systems may use semiconductor diode lasers or superluminescent diodes as light sources. Broadband semiconductor light sources have been used in fiber optic rotation sensors to reduce noise arising from backscattering in the fiber and for reducing errors caused by the optical Kerr effect. For a high precision fiber optic rotation sensor the wavelength of the light source must be stabilized since the scale factor of the sensor depends upon the source wavelength. A navigation grade rotation sensor requires wavelength stability of about one part in $10^6$.

All solid state coherent light sources include two polished parallel faces that are perpendicular to the plane of a junction of the p-type and n-type semiconductors. The combination of electrons injected from the n-region into the p-region with holes, or positive charge carriers, in the p-region causes the emission of coherent light. The emitted light reflects back and forth across the region between the polished surfaces and is consequently amplified on each pass through the junction.

The wavelength of the light emitted from a solid state coherent light source varies as functions of the operating temperature and the injection current applied. Effective use of coherent light sources in an optical rotation sensor requires an output of known wavelength.

Superluminescent diodes used as light sources in fiber optic rotation sensors typically have fractional linewidths of about 10,000 ppm. They also have operating lifetimes of about 100 hours and provide about 500 $\mu$W or less optical power into an optical fiber. SLD's have linewidth to frequency stability ratios of about 10,000 and require relatively high injection currents that typically exceed 100 mA. The short operating lifetime and excessive linewidths makes SLD's unacceptable for fiber optic rotation sensors, which should operate reliably for thousands of hours without source replacement.

Some familiarity with polarization of light and propagation of light within a guiding structure will facilitate an understanding of the present invention. It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate with low attenuation are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. The direction of the electric field vector in an electromagnetic wave is the polarization of the wave. If only the electric field vector is perpendicular to the direction of propagation, which is usually called the optic axis, then the wave is a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode.

None of the normal modes require a definite direction of the field components. In a TE mode, for example, the electric field may be in any direction that is perpendicular to the optic axis. In general, a wave will have random polarization in which there is a uniform distribution of electric field vectors pointing in all directions permissible for a given mode. If all the electric field vectors in a wave point in only a particular direction, the wave is linearly polarized. If the electric field consists of two orthogonal electric field components of equal magnitude and a phase difference of 90°, the electric field is circularly polarized, because the net electric field is a vector that rotates around the propagation-direction at an angular velocity equal to the frequency of the wave. If the two linear polarizations are unequal or have a phase difference other than 90°, the wave has elliptical polarization. In general, any arbitrary polarization can be represented by the sum of two orthogonal linear polarizations, two oppositely directed circular polarizations or two counter rotating elliptical polarizations that have orthogonal major axes.

An optical fiber comprises a central core and a surrounding cladding. The refractive index of the cladding is greater than that of the core. The diameter of the core is so small that light guided by the core impinges upon the core-cladding interface at angles less than the critical angle for total internal reflection.

The boundary between the core and cladding is a dielectric interface at which certain well-known boundary conditions on the field components must be satisfied. For example, the component of the electric field parallel to the interface must be continuous. A single mode optical fiber propagates electromagnetic energy having an electric field component perpendicular to the core-cladding interface. Since the fiber core has an index of refraction greater than that of the cladding and light impinges upon the interface at angles greater than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the "evanescent field."

The velocity of an optical signal depends upon the index of refraction of the medium through which the light propagates. Certain materials have different refraction indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a velocity difference between the two polarizations.

There are a number of birefringent materials. For example, depending on their structure and orientation to the light propagating through it, certain crystals are circularly birefringent; and other crystals are linearly birefringent. Other types of crystals, such as quartz, can have both circular birefringence and linear birefringence.

Stabilization of the scale factor is critical to the performance of a high accuracy fiber optic gyroscope. The scale factor, which relates the angular rotation rate of the sensor to the Sagnac phase shift, is sensitive to changes in the length of the fiber and to variations on the operation wavelength of the source. In superluminescent diodes (SLDs), variations in the emission wavelength are caused by thermal fluctuations in the active region caused by changes in the ambient temperature and in the interaction current. Typically, the temperature dependence of the SLD emission wavelength is about 0.2 nanometers per ° C. To obtain the required wavelength stability by thermal means alone would require the temperature of the SLD to be held constant to a few millidegrees. The need for such stringent temperature stability can be obviated by using a reference interferometer to continuously monitor the emission spectrum of the SLD. In this scheme, changes in the emission spectrum generate an error signal which is processed and fed back to the diode to hold the wavelength constant.

Lasers, with their long coherence length, are readily stabilized by using a temperature stabilized scanning Fabry-Perot interferometer to lock the cavity length. However, the large spectral bandwidth of the SLD precludes the use of optical spectrum analyzers to monitor the emission wavelength of the diode. The mirrors of a Fabry-Perot interferometer to analyze to typical 10 nm emission bandwidth of an SLD would have to be spaced approximately 1 μm apart, which is impractical.

Previously proposed methods for stabilizing the SLD wavelength use either an in-line technique in which the dispersion of the fiber is used to monitor the SLD wavelength or a break out method in which the SLD emission is monitored independently. In the first method, a Bragg cell is required to generate the large frequency shifts needed to confidently utilize fiber dispersion. Such bulk optic components placed in line with the sensor would introduce alignment problems which could become more pronounced with temperature cycling.

A practical wavelength stabilization scheme must take into account the volume budget of the gyro and should be capable of being packaged within the gyro housing. This constraint limits the volume of the wavelength stabilization device to a maximum of a few cubic centimeters.

SUMMARY OF THE INVENTION

A device according to the invention for controlling the frequency of an optical signal output from an optical signal source comprises a first birefringent material positioned to receive an optical signal output from the optical source so that the signal propagates therethrough; means for modulating the birefringence of the first birefringent material; a second birefringent material positioned to receive the signal output from the first birefringent material; detector means for forming an electrical signal indicative of the phase shift produced by the first and second birefringent materials between a pair of orthogonal polarizations in the optical signal received by the first birefringent material; and means for processing the electrical signal for adjusting the frequency of the optical signal output from the signal source.

The device according to the invention for controlling the frequency of an optical signal output from an optical signal source may further comprise a first polarizing beam splitter positioned between the optical source and the first birefringent material; and a second polarizing beam splitter positioned between the detector means and the second birefringent material.

The first polarizing beamsplitter preferably has a polarization axis oriented at 45° to the principal axes of the first birefringent material and the second polarizing beamsplitter preferably has a polarization axis oriented at 45° to the principal axes of the second birefringent material.

The modulating means in the device according to the invention for controlling the frequency of an optical signal output from an optical signal source preferably comprises an oscillator electrically coupled to the first birefringent material, the first birefringent material being electrooptically active so that signals from the oscillator change at least one of the refractive indices of the first birefringent material. The modulating means preferably further includes a mixer connected both to the oscillator and to the detecting means to receive signals therefrom; and an amplifier connected to the mixer to receive the mixed oscillator and detector signals.

The device according to the invention for controlling the frequency of an optical signal output from an optical signal source includes means for producing a temperature-independent phase shift between the two polarizations that are input to the first birefringent material and output from the second birefringent material. The means for producing a temperature-independent phase shift includes a first length $L_1$ of the first birefringent material and a second length $L_2$ of the second birefringent material such that $L_1/L_2 = K_2 B_2/K_1 B_1$, where $B_1$ and $B_2$ represent the birefringence of the first and second birefringent materials, respectively and $$K_1 = (1/B_1) dB_1/dT + (1/L_i) dL_1/dT, \text{ and}$$

$$K_2 = (1/B_2) dB_2/dT + (1/L_2) dL_2/dT,$$

with T representing the temperature of the first and second birefringent materials.

The method of the invention for controlling the frequency of an optical signal output from an optical signal source comprises the steps of positioning a first birefringent material to receive an optical signal output from the optical source so that the signal propagates therethrough; modulating the birefringence of the first birefringent material; positioning a second birefringent material to receive the signal output from the first birefringent material; forming an electrical signal indicative of the phase shift produced by the first and second birefringent materials between a pair of orthogonal polarizations in the optical signal received by the first birefringent material; and processing the electrical signal for adjusting the frequency of the optical signal output from the signal source.

The method of the invention may further comprise the steps of placing a first polarizing beam splitter between the optical source and the first birefringent material; and placing a second polarizing beam splitter between the detector means and the second birefringent material. The method of the invention may further comprise the steps of arranging the first polarizing beamsplitter to have a polarization axis oriented at 45° to the principal axes of the first birefringent material and arranging the second polarizing beamsplitter to have a polarization axis oriented at 45° to the principal axes of the second birefringent material.

The method of the invention may further comprise the step of forming the modulating means to comprise an oscillator electrically coupled to the first birefringent material, the first birefringent material being electrooptically active so that signals from the oscillator change at least one of the refractive indices of the first birefringent material. The step of forming the modulating means may further include the steps of connecting a mixer both to the oscillator and to the detecting means to receive signals therefrom; and amplifying the mixed oscillator and detector signals.

The method of the invention further comprises the step of producing a temperature-independent phase shift between the two polarizations that are input to the first birefringent material and output from the second birefringent material. The step of producing a temperature-independent phase shift includes forming the first birefringent material to have a first length $L_1$ and forming the second birefringent material to have second length $L_2$ such that $L_1/L_2 = K_2 B_2/K_1 B_1$ where $B_1$ and $B_2$ represent the birefringence of the first and second birefringent materials, respectively and $$K_1 = (1/B_1) dB_1/dT + (1/L_i) dL_1/dT, \text{ and}$$

$$K_2 = (1/B_2) dB_2/dT + (1/L_2) dL_2/dT,$$

with T representing the temperature.

The invention also includes a fiber optic rotation sensing system comprises an optical source; a first optical fiber for receiving light from the optical source; a second optical fiber having a sensing coil formed therein; optical coupling means for coupling light between the first and second optical fibers; and means for controlling the frequency of an optical signal output from an optical signal source, comprising a first birefringent material positioned to receive an optical signal output from the optical source so that the signal propagates therethrough; means for modulating the birefringence of the first birefringent material; a second birefringent material positioned to receive the signal output from the first birefringent material; detector means for forming an electrical signal indicative of the phase shift produced by the first and second birefringent materials between a pair of orthogonal polarizations in the optical signal received by the first birefringent material; and means for processing the electrical signal for adjusting the frequency of the optical signal output from the signal source.

The fiber optic rotation sensing system according to the invention further includes means for producing a temperature-independent phase shift between the two polarizations that are input to the first birefringent material and output from the second birefringent material. The means for producing a temperature-independent phase shift preferably includes a first length $L_1$ of the first birefringent material and a second length $L_2$ of the second birefringent material such that $L_1/L_2 = K_2 B_2/K_1 B_1$, where $B_1$ and $B_2$ represent the birefringence of the first and second birefringent materials, respectively and $$K_1 = (1/B_1) dB_1/dT + (1/L_i) dL_1/dT, \text{ and}$$

$$K_2 = (1/B_2) dB_2/dT + (1/L_2) dL_2/dT,$$

with T representing the temperature of the first and second birefringent materials.

The method of the invention for measuring rotations comprises the steps of producing a light beam with an optical source; receiving light from the optical source with a first optical fiber; forming a sensing coil in a second optical fiber; coupling light between the first and second optical fibers so that the sensing coil guides a pair of counterpropagating waves; and controlling the frequency of an optical signal output from the optical signal source, comprising the steps of positioning a first birefringent material to receive an optical signal output from the optical source so that the signal propagates therethrough; modulating the birefringence of the first birefringent material; positioning a second birefringent material to receive the signal output from the first birefringent material; forming an electrical signal indicative of the phase shift produced by the first and second birefringent materials between a pair of orthogonal polarizations in the optical signal received by the first birefringent material; and processing the electrical signal for adjusting the frequency of the optical signal output from the signal source.

The method of the invention for sensing rotations further comprises the step of producing a temperature-independent phase shift between the two polarizations that are input to the first birefringent material and output from the second birefringent material. The step of producing a temperature-independent phase shift includes forming the first birefringent material to have a first length $L_1$ and forming the second birefringent material to have second length $L_2$ such that $L_1/L_2 = K_2B_2/K_1B_1$ where $B_1$ and $B_2$ represent the birefringence of the first and second birefringent materials, respectively and $$K_1 = (1/B_1) \, dB_1/dT + (1/L_1) \, dL_1/dT, \text{ and}$$

$$K_2 = (1/B_2) \, dB_2/dT + (1/L_2) \, dL_2/dT,$$

with T representing the temperature.

DESCRIPTION OF THE PREFERRED EMBODIMENT

Figure 1:
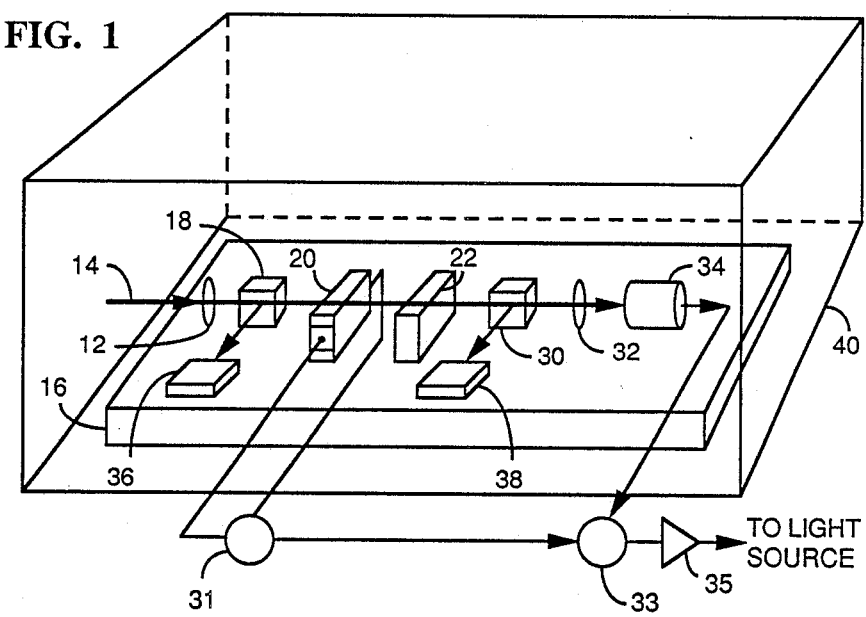
FIG. 1 illustrates a thermally compensated reference interferometer according to the invention.

Referring to FIG. 1, a thermally compensated reference interferometer 10 according to the invention includes a lens 12 that receives light from an optical fiber 14. Light is input to the fiber 14 by an optical source 15, shown in FIG. 7. The lens 12 is mounted on a baseplate 16. The lens 12 focuses the light onto a polarizing beamsplitter 18, which is also mounted on the baseplate 16. The polarizing beamsplitter 18 is preferably a bulk optics device for polarizing an optical input at 45° to the optic axis. The optic axis is conveniently defined as a line collinear with the light beam input from the fiber 14.

Light transmitted straight through the polarizing beamsplitter 18 impinges upon a first crystal 20 that is mounted to the baseplate 16. Light transmitted through the crystal 20 impinges upon a second crystal 22 mounted on the baseplate 16 near the crystal 20. Although other materials may be used the crystal 20 is preferably formed of lithium niobate, and the crystal 22 is formed of lithium tantalate. Both of these crystals 20 and 22 are birefringent electrooptically active materials.

Referring still to FIG. 1, a pair of electric leads 24 and 25 are connected to the crystal 20. Although several other pairs of crystals would satisfy the temperature stability requirements of the reference interferometer 10, electro-optic crystals are preferred to provide a discriminant for phase-sensitive detection. This discriminant is obtained by applying an alternating voltage from an oscillator 31 to the crystal 20 to modulate the phase of the optical wave transmitted therethrough.

Light transmitted through the crystal 22 is then input to a second polarizing beamsplitter 30 mounted to the baseplate 16. The polarizing beamsplitter 30 polarizes the input light along a line at 45° to the optic axis. Light transmitted straight through the polarizing beamsplitter 30 then impinges upon a lens 32, which focuses the light onto a detector 34 that is also mounted on the baseplate 16. A pair of absorbers 36 and 38 receive the light rejected by the polarizers 18 and 30, respectively. These absorbers 36 and 38 prevent the rejected light from having any effect on the signal input to the detector 34.

The baseplate 16 and all the components mounted thereon are preferably enclosed in a hermetically sealed container 40.

For an optical beam polarized at 45° to the optic axis of the lithium niobate crystal 20 and lithium tantalate crystal 22, the phase difference between the two orthogonally polarized components is $$Y = 2\pi S/\lambda \tag{1}$$

where $\lambda$ is the wavelength of the source. The optical pathlength difference, S, between the two polarizations propagating in the crystals, is $$S = L_1B_1 - L_2B_2 \tag{2}$$

where $L_1$, $L_2$ and $B_1$, $B_2$ are the lengths and birefringences of crystals 20 and 22, respectively. The birefringence is the difference in refractive index for waves of different polarizations.

For a thermally insensitive reference interferometer, the temperature derivative of the phase difference, Y, must be zero. Since the crystals 20 and 22 are birefringent, propagation of the light through them causes a phase change between the two polarization components. Differentiating Equation (1) with respect to temperature and setting the result equal to zero gives $$L_1/L_2 = K_2B_2K_1B_1 \tag{3}$$

where
$$K_i = (1/B_i) dB_i/dt + (1/L_i) dL_i/dt \tag{4}$$

is the sum of the normalized rate of change of birefringence with temperature and the thermal expansion coefficient of each crystal $X_i$, $i=1, 2$.

The lengths of the crystals 20 and 22 in the reference interferometer 10 are subject to the restriction imposed by the spectral bandwidth of the source. That is, for good fringe visibility in the interferometer 10 the optical path difference between the two polarizations must be less than the coherence length of the source, $X_{coh}$. This criterion sets an upper limit on the total length of the crystals 20 and 22 in the interferometer 10. Using Equation (3) and the requirement that the optical path-length difference be less than the coherence length of the source, an upper limit on the absolute lengths of the crystals 20 and 22 is obtained. For the crystal 20, the upper length limit is $$L_1 < X_{coh}/[B_1(1-K_1/K_2)] \quad (5)$$

Figure 3:
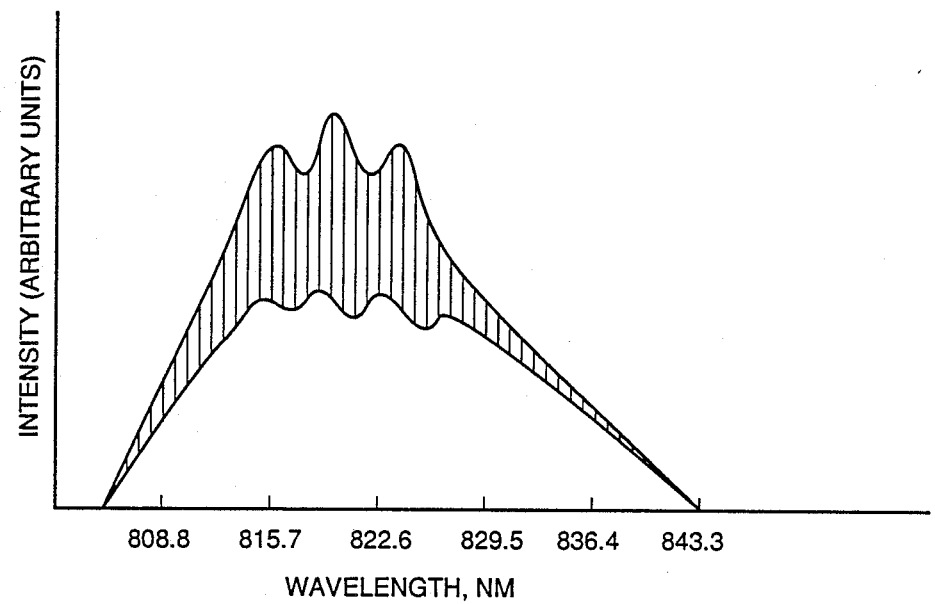
FIG. 3 graphically illustrates the spectrum of a typical superluminescent diode used as an optical source in a fiber optic gyroscope.

FIG. 3 illustrates the spectrum of a typical SLD. The SLD has a 57 μm coherence length and a center wavelength of 820 nm. The maximum length of the lithium niobate crystal 20 is therefore 635 μm. From the length ratio $L_1/L_2=1.092$ as determined from Equation (3), the maximum length of the lithium tantalate crystal 22 is 582 μm. Thus, the maximum combined length of the two crystals 20 and 22 in the interferometer 10 is 1.217 mm.

Figure 5:
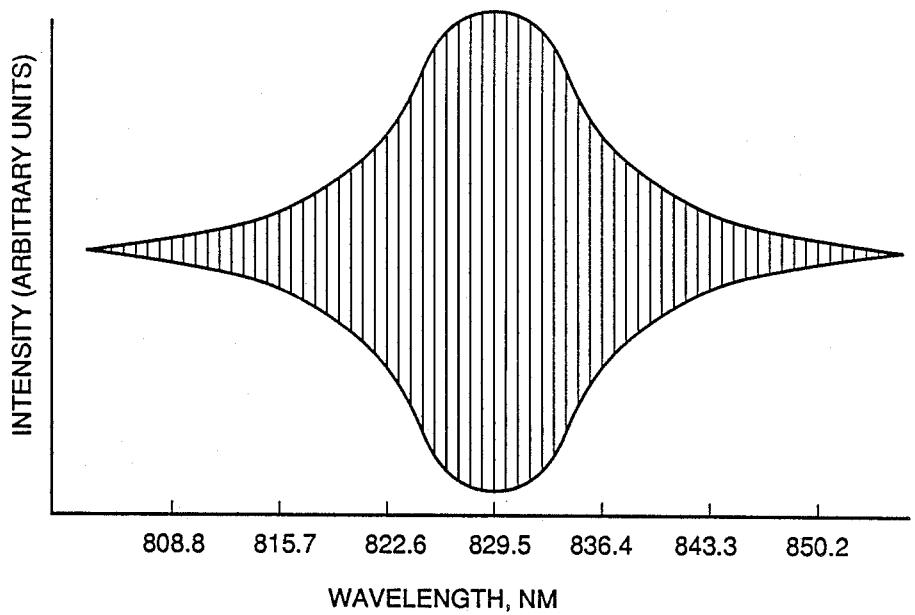
FIG. 5 graphically illustrates the output of the thermally compensated reference interferometer of FIG. 1.
Figure 4:
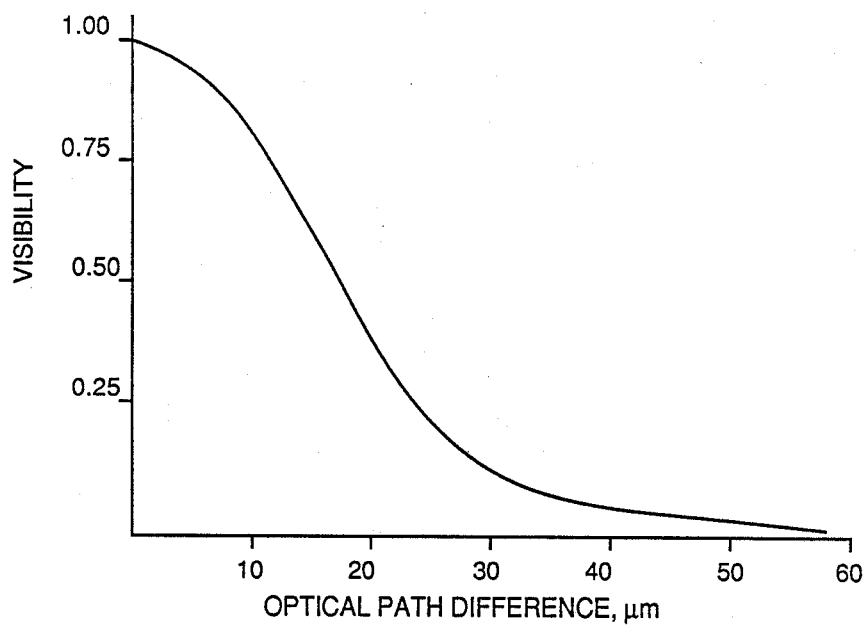
FIG. 4 graphically illustrates the visibility of the interference pattern produced by the thermally compensated reference interferometer of FIG. 1 as a function of the optical path difference in the interferometer.

FIG. 5 illustrates the output of the interferometer 10 for light input from an SLD as a function of the optical path difference. FIG. 4 illustrates the visibility of the interference pattern as a function of optical path difference.

Optimization of the signal to noise ratio to facilitate signal processing requires that the fringe visibility in the interferometer 10 be close to unity. Therefore, the interferometer 10 is designed to have an optical path difference of 8.2 μm and is fixed on the tenth fringe from zero pathlength difference. Making the optical path difference between the two orthogonal polarizations an integral number of wavelengths ensures that the throughput of the second polarizer 30 is a maximum when it is aligned parallel to the polarizer 18. For the 8.2 μm optical path difference the lengths of the two crystals 20 and 22 are 91 μm and 84 μm, respectively. The requirements of crystal thickness and tolerance, although not routine, are within the capabilities of crystal vendors.

Figure 6:
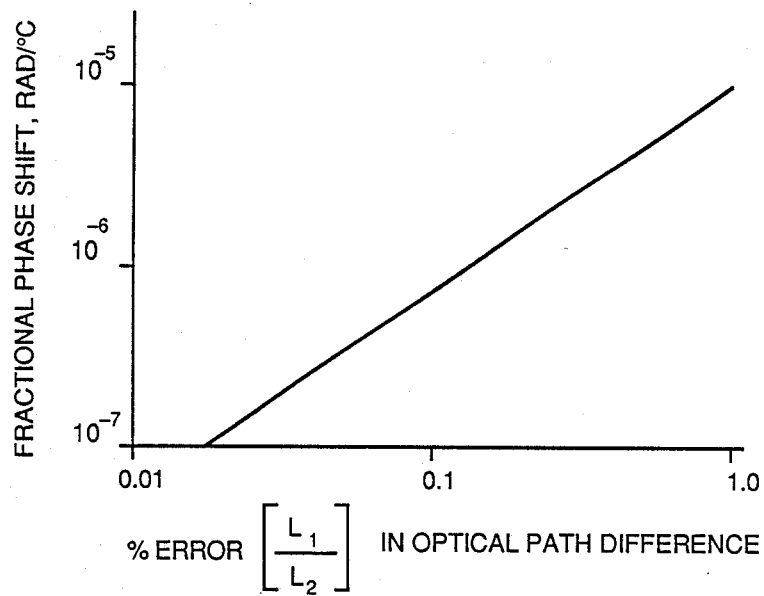
FIG. 6 graphically illustrates the fractional phase shift per ° C. as a function of the ratio of the lengths of the crystals included in the thermally compensated reference interferometer of FIG. 1.

FIG. 6 is a plot of the fractional phase shift per °C. $[(d\gamma/dT)/Y]$, as a function of the length ratio $L_1/L_2$. For a 1% error in the length ratios, which corresponds to an error of ±0.5 μm in absolute lengths of the crystals 20 and 22, the fractional phase shift per °C. in the interferometer 10 is 3.3 ppm/°C. By controlling the crystal temperatures to ±0.5 °C., the phase shift in the interferometer 10 can be held to within 3 ppm, which is necessary for holding the wavelength constant to the required 10 ppm.

Figure 2:
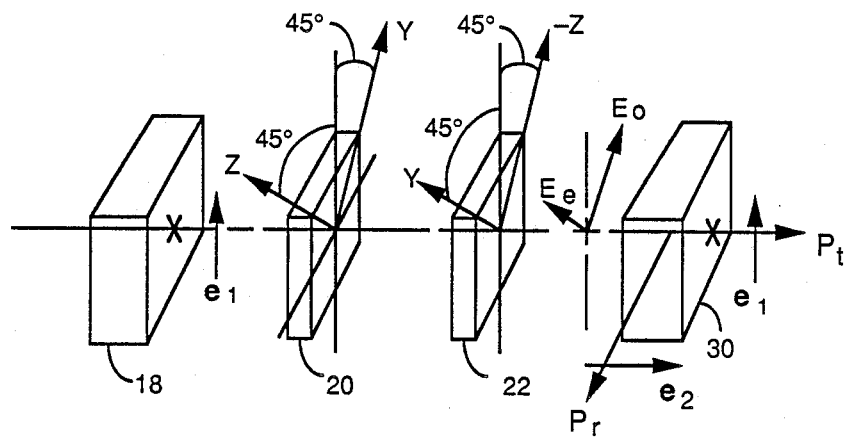
FIG. 2 schematically illustrates orientation of crystals in the thermally compensated reference interferometer of FIG. 1 relative to the polarization of the incident light.

Referring to FIG. 2, the electric field for a quasi-monochromatic light wave, $E_i$, polarized parallel to $e_1$ and incident on the birefringent crystal 20 is $$E_i(x,t) = e_1 E_o \cos(Kx - \omega t) \quad (6)$$

where $K=2\pi/\lambda$ is the wave number, $\omega$ is the angular frequency of the wave in radians per second, and x and t re the is displacement and time coordinates, respectively. The optic axes of the two crystals 20 and 22 are aligned parallel to each other and at 45° to the polarization of the incident wave. The wave exiting the crystal 22 and directed to the lens 32 includes two orthogonal components shifted in phase with respect to each other. The field distributions for the ordinary and the extraordinary polarizations are $$E_o = E\cos(K_{o1}L_1 + K_{o2}L_2 - \omega t) \quad (7)$$

and $$E_e = E\cos(k_{e1}L_1 + k_{o2}L_2 - \omega t) \quad (8)$$

respectively. $L_1$ and $L_2$ are the lengths of the crystals 20 and 22, respectively, and $k_o$ and $k_e$ are the wave numbers of the ordinary and extraordinary waves in the crystals. The polarizing beamsplitter 30 is oriented so that the polarization of the transmitted wave is parallel to $e_1$. Time-averaged transmitted and reflected power are respectively given by $$P_t = P_o[1 + V\cos(Y)]/2 \quad (9)$$

and $$P_r = P_o[1 + V\cos(Y)]/2. \quad (10)$$

$P_o$ is the square of the field amplitude, $E_o$. For a broad bandwidth source such as an SLD, the cosine functions in Equations (9) and (10) are multiplied by the fringe visibility function, V. For an SLD with a 10 nm spectral bandwidth the visibility function monotonically decreases from a maximum value of one at zero optical path difference to zero at approximately 60 μm as shown in FIG. 4. The design of the interferometer 10 maximizes the transmitted power, $P_t$, from Equation (9), and makes the reflected power, $P_r$, vanishingly small by making the optical path difference of the interferometer an integral number of wavelengths. For an SLD with a center wavelength of 820 nm as shown in FIG. 3, the interferometer 10 has an optical path difference of 8.2 μm.

A discriminant for phase-sensitive detection of the wavelength shifts in the SLD is obtained by electro-optically modulating the phase retardation in the lithium niobate crystal 20. This crystal 20 is x-axis cut, and electrode 100 is bonded to an x-z facet as shown in FIG. 1. Another electrode (not shown) similar to the electrode 100 is mounted to the other x-z facet. In this configuration, use is made of the large $r_{42}$ electro-optic coefficient to reduce the voltage required to achieve the desired phase shift in the crystal 20. Using accepted values for $n_o=2.2598$, $r_{42}$ ($32\times10^{-12}$) m/V, and $r_{22}$ ($6.8\times10^{12}$), the scale factor for the 91 μm long lithium niobate crystal 20 is 0.1 rad m/V.

To minimize the applied voltage, the optical beam inside the interferometer 10 is soft-focused to a beam radius of 18 μm with a Rayleigh range of 1.0 mm, which is approximately 5 times the interferometer length. This relatively large Rayleigh range ensures a near planar wavelength over the 175 μm long interferometer. The crystals 20 and 22 are cut to a 250 μm square cross-section in the y-z plane, which is large enough to accommodate the focused optical beam without any appreciable diffraction effects. With this 250 μm separation between the electrodes on the x-z facets of the lithium niobate crystal, the scale factor is 0.44 milliradian per volt.

The phase difference of the two polarizations optical wave in the interferometer can be varied by applying an electric field to the electro-optic crystal 20. A sinusoidal electric field of amplitude $E_y$ and angular frequency $\omega$ will modulate the phase difference and provide a discriminant for phase sensitive detection.

From Equation (9) the power transmitted through the polarizing beamsplitter 30 is $$P_t = P_o[1 + V\cos(Y + Z\cos\omega t)] \quad (11)$$

where Y, given by Equation (1), is the phase retardation in the interferometer 10 in the absence of the electric field applied to the crystal 20, and Z is the electrically induced phase retardation.

Since by design Y is an integral multiple of $2\pi$, the phase of the optical throughput is modulated about a maximum. Wavelength shifts in the emission spectrum of the SLD are detected as a signal at the fundamental of the modulation frequency $\omega$.

Figure 7:
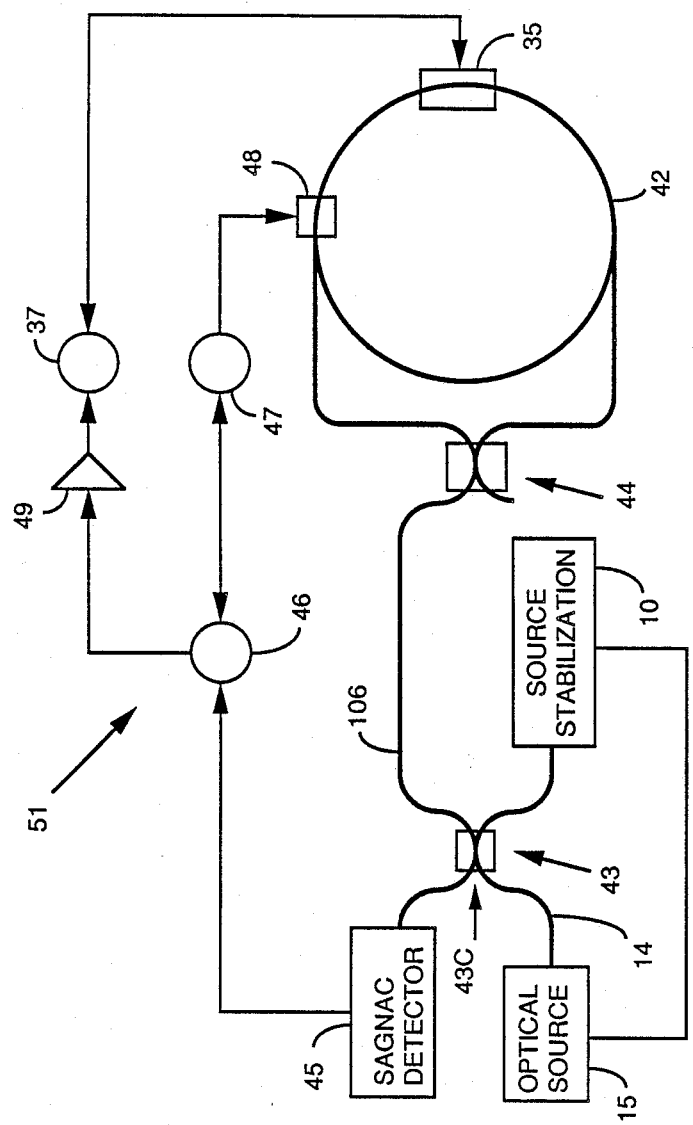
FIG. 7 schematically illustrates a fiber optic gyroscope that may be used with the thermally compensated reference interferometer of FIG. 1.

When the source stabilization system 10 shown in FIG. 1 and 7 is activated, the phase shift, F, induced by the crystals 20 and 22 opposes the phase shift errors, y, induced by the drift in the emission wavelength of the SLD. The transmitted power, $P_t$, is then $$P_t = P_o[1 + V\cos(y - F + Z\cos\omega t)]. \quad (12)$$

Expanding Equation (11) gives a Bessel function series $$P_t = P_o + P_o[J_o(Z)\cos(y-F) + J_1(Z)\sin(\omega t)\sin(y-F) + J_2(Z)\cos(\omega t)\cos(y-F) + ... \quad (13)$$

The servo system process all information in the spectral vicinity of $\omega$ and ignores all other terms. The effective input signal to the servo system from Equation (12) is $$P_t(\text{eff}) = P_o J_1(Z)\sin(\omega t)\sin(y-F) \quad (14)$$

Referring again to FIGS. 1 and 7, an output signal of frequency $\omega$ from the oscillator 31 is input to a mixer 33, which also receives the electrical signal from the photodetector 34. The effective input signal given by Equation (14) is mixed with the local oscillator signal of frequency $\omega$ from the oscillator 31. The output of the mixer 33 is then low pass filtered and amplified by the amplifier 35. The output of the amplifier 35 is the feedback signal which is used to stabilize the emission wavelength of the SLD, and is given by $$FB = P_o a \sin(y-F), \quad (15)$$

where A represents the electronic gain of the amplifier 351 which connected between the interferometer 10 and the source 15. The signal FB is input to the optical source 15 to control the frequency of the emitted light signal. In a solid state light source, the signal FB controls the injection current. The frequency stabilization apparatus of the invention may be used with gtas discharge lasers (not shown), in which case the signal FB controls the length of the resonant cavity in which the discharge occurs.

The object of the feedback signal is to produce a phase shift, F, which cancels the phase shift y. When, as in all servo systems, the ability of the feedback phase shift to track the phase shift, y, induced by changes in the source wavelength is determined by the loop gain of the amplifier 35. The loop gain for the servo system described is preferably large enough (>100) so that y-F is always less than 0.1 radians. In this case, the sin (y-F) term in Equation (14) can be approximated by (y-F)

with negligible error. The servo system thus operates over a linear range, and parameters that provide the wavelength stabilization are:

$P_o = 10 \mu W$
G = loop gain (in radians) = 200 or greater
BW = loop bandwidth = 100 Hz
Y = loop bandwidth = 100 Hz
Z = peak phase modulation amplitude = 0.1 radians
d = servo system damping ratio > 0.5

Under the above operating conditions the wavelength stabilization system 10 maintains a source wavelength stability of better than 10 ppm.

Referring to FIG. 7, the fiber optic rotation sensor 41 comprises a sensing loop 42 formed in the fiber 106. The optical signal from the source 15 propagates in the fiber 14 to an optical coupler 43, which divides the light between the fiber 14 and the fiber 106. The signal in the fiber 106 propagates to an optical coupler 44 that divides the light to produce light waves that propagate counterclockwise (CCW) and clockwise (CW) through the loop. After traversing the loop 42, the waves then impinge upon the optical coupler 44. The optical coupler 44 then combines portions of the waves so that a superposition of the CW and CCW waves propagates back through the fiber 106 to the optical coupler 43, which directs a portion of the combined waves to a Sagnac detector 45, which may be any suitable photodiode.

The output of the Sagnac detector 45 is an electrical signal indicative of the rotation rate of the sensing loop about its sensing axis, which may be a line perpendicular to the plane of the loop 42. The wave traveling around the loop 42 in the direction of rotation will have a longer transit time in the loop 42 than the wave traveling opposite to the direction of rotation. This difference in transit time is detected as a phase shift in the waves. The amount of phase shift is a function of the rotation rate and the wavelength of the light input to the sensing loop 42. The scale factor relates the rotation rate to the parameters of the sensing system.

The electrical output of the Sagnac detector 45 is input to a summing amplifier 46 that also receives signals from an oscillator 47. The oscillator 47 drives a phase modulator 48 that is formed to adjust the phase of light in the sensing loop 42. The output of the summing amplifier 46 is input to a second amplifier 49 that produces a control signal that is input to an oscillator 37. The oscillator 37 is preferably a sawtooth wave generator. The sawtooth wave drives a serrodyne phase modulator 53 that adjusts the phase of the light in the loop 42.

The summing amplifier 46, oscillator 47, phase modulator 48, amplifier 49, oscillator 39 and phase modulator 53 comprise a phase nulling servo loop 51. In order to provide a wider dynamic range, the servo loop adjusts the light in the sensing loop 42 to null the phase differences caused by rotations of the sensing loop. The rotation rate is determined by measuring the amount of phase modulation by the phase modulator 53 to null the rotation induced phase shift.

A fiber optic directional coupler suitable for use in single mode applications as the coupler 43 of FIG. 7 is described in the Mar. 29, 1980 issue of Electronics Letters, Vol. 28, No. 28. pp. 260–261 and in U.S. Pat. No. 4,493,528 issued Jan. 15, 1985 to Shaw et al. That patent is assigned to the Board of Trustees of the Leland Stanford Junior University. The disclosure of that patent is incorporated by reference into the present disclosure.

Figure 8:
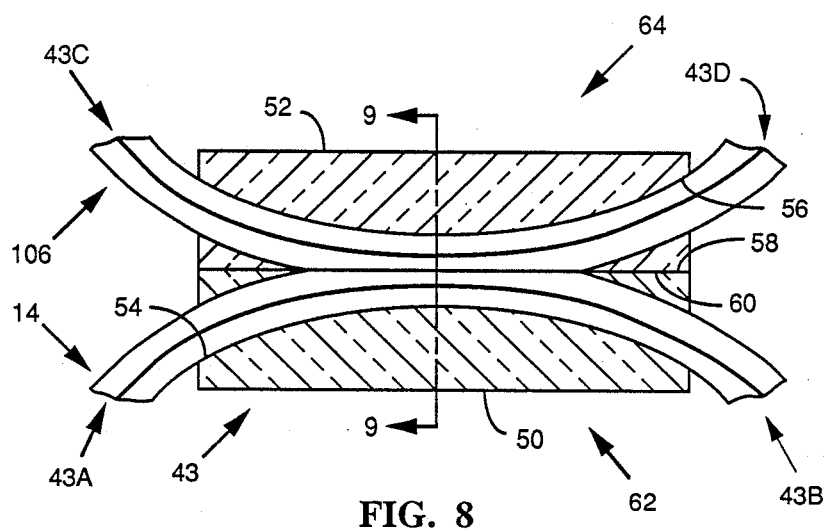
FIG. 8 is a cross sectional view of a fiber optic directional coupler that may be included in the fiber optic gyroscope of FIG. 7.
Figure 9:
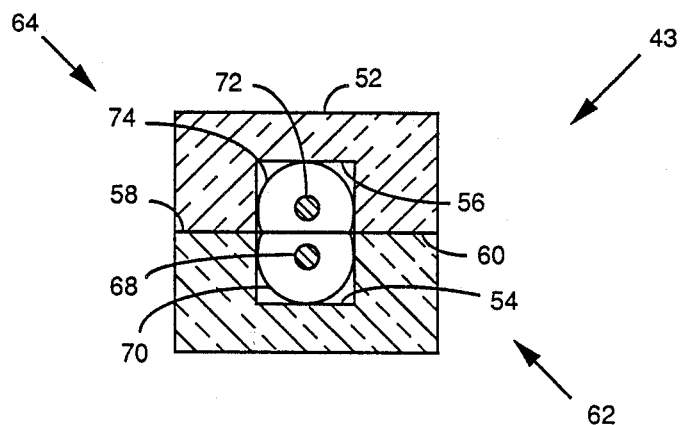
FIG. 9 is a cross sectional view along line 9—9 of FIG. 8.

As illustrated in FIGS. 8 and 9, the coupler 43 includes the optical fibers 14 and 106 of FIG. 7 mounted in a pair of substrates 50 and 52, respectively. The fiber 14 is mounted in a curved groove 54 formed in an optically flat surface 58 of the substrate 50. Similarly, the fiber 106 is mounted in a curved groove 56 formed in an optically flat surface 60 of the substrate 52. The substrate 50 and fiber 14 mounted therein comprise a coupler half 62, and the substrate 52 and fiber 106 mounted therein comprise a coupler half 64.

The curved grooves 54 and 56 each have a radius of curvature that is large compared to the diameters of the fibers 14 and 106, which are ordinarily substantially identical. The widths of the grooves 54 and 56 are slightly larger than the fiber diameters to permit the fibers 14 and 106 to conform to the paths defined by the bottom walls of the grooves 54 and 56, respectively. The depths of the grooves 54 and 56 vary from a minimum at the center of the substrates 50 and 52, respectively, to a maximum at the edges of the substrates 50 and 52. The variation in groove depth permits the optical fibers 14 and 106, when mounted in the grooves 54 and 56, respectively, to gradually converge toward the centers and diverge toward the edges of the substrates 50 and 52, respectively. The gradual curvature of the fibers 14 and 106 prevents the occurrence of sharp bends or other abrupt changes in direction of the fibers 14 and 106 to avoid power loss through mode perturbation. The grooves 54 and 56 may be rectangular in cross section; however, other cross sectional configurations such as U-shaped or V-shaped may be used in forming the coupler 43.

Referring still to FIGS. 8 and 9, at the centers of the substrates 50 and 52, the depths of the grooves 54 and 56 are less than the diameters of the fibers 14 and 106. At the edges of the substrates 50 and 52, the depths of the grooves 54 and 56 are preferably at least as great as the fiber diameters. Fiber optic material is removed from each of the fibers 14 and 106 by any suitable method, such as lapping, to form oval-shaped in the fibers 14 and 106 that are coplanar with the confronting surfaces 58 and 60 of the substrates 50 and 52. The oval surfaces are juxtaposed in facing relationship to form an interaction region 66 where the evanescent field of light propagated by each of the fibers 14 and 106 interacts with the other fiber. The amount of fiber optic material removed increases gradually from zero near the edges of the substrates 50 and 52 to a maximum amount at their centers. As shown in FIGS. 8 and 9, the tapered removal of fiber optic material enables the fibers 14 and 106 to converge and diverge gradually, which is advantageous for avoiding backward reflection and excessive loss of light energy at the interaction region 66.

Light is transferred between the fibers 14 and 106 by evanescent field coupling at the interaction region 66. The optical fiber 14 comprises a central core 68 and a surrounding cladding 70. The fiber 106 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 14 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the optical energy initially propagated by the fiber 14 extends a sufficient distance into the fiber 43, energy will couple from the fiber 14 into the fiber 106.

To ensure proper evanescent field coupling, the amount of material removed from the fibers 14 and 106 must be carefully controlled so that the spacing between the cores of the fibers 14 and 106 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 14 and 106. If too little material is removed, the cores will not be sufficiently close to permit the evanescent fields to cause the desired interaction of the guided waves; and therefore, insufficient coupling will result.

Removal of too much material alters the propagation characteristics of the fibers, resulting in loss of light energy from the fibers due to mode perturbation. However, when the spacing between the cores of the fibers 14 and 106 is within the critical zone, each fiber 14 and 106 receives a significant portion of the evanescent field energy from the other to achieve good coupling without significant energy loss. The critical zone includes the region in which the evanescent fields of the fibers 14 and 106 overlap sufficiently to provide good evanescent field coupling with each core being within the evanescent field of light guided by the other core. It is believed that for weakly guided modes, such as the $HE_{14}$ mode guided by single mode fibers, mode perturbation occurs when the fiber core is exposed. Therefore, the critical zone is the core spacing that causes the evanescent fields to overlap sufficiently to cause coupling without causing substantial mode perturbation induced power loss.

The coupler 43 of FIG. 7 includes four ports labeled 43A, 43B, 43C and 43D. Ports 43A and 43B, which are on the left and right sides, respectively, of the coupler 43 correspond to the fiber 14. The ports 43C and 43D similarly correspond to the fiber 106. For purposes of explanation, it is assumed that an optical signal input is applied to port 43A through the fiber 14. The signal passes through the coupler 43 and is output at either one or both of ports 43B or 43D depending upon the amount of coupling between the fibers 14 and 106. The "coupling constant" is defined as the ratio of the coupled power to the total output power. In the above example, the coupling constant is the ratio of the power output at port 43D divided by the sum of the power output at the ports 43B and 43D. This ratio is sometimes called the "coupling efficiency", which is typically expressed as a percent. Therefore, when the term "coupling constant" is used herein, it should be understood that the corresponding coupling efficiency is equal to the coupling constant times 100.

The coupler 43 may be tuned to adjust the coupling constant to any desired value between zero and 1.0 by offsetting the confronting surfaces of the fibers 14 and 106 to control the dimensions of the region of overlap of the evanescent fields. Tuning may be accomplished by sliding the substrates 50 and 52 laterally or longitudinally relative to one another.

Light that is cross-coupled from one of the fibers 14 and 106 to the other undergoes a phase shift of $\pi/2$, but light that passes straight through the coupler 43 without being cross-coupled is not shifted in phase. For example, if the coupler 43 has a coupling constant of 0.5, and an optical signal is input to port 43A, then the outputs at ports 43B and 43D will be of equal magnitude; but the output at port 43D will be shifted in phase by $\pi/2$ relative to the output at port 43B.

Figure 12:
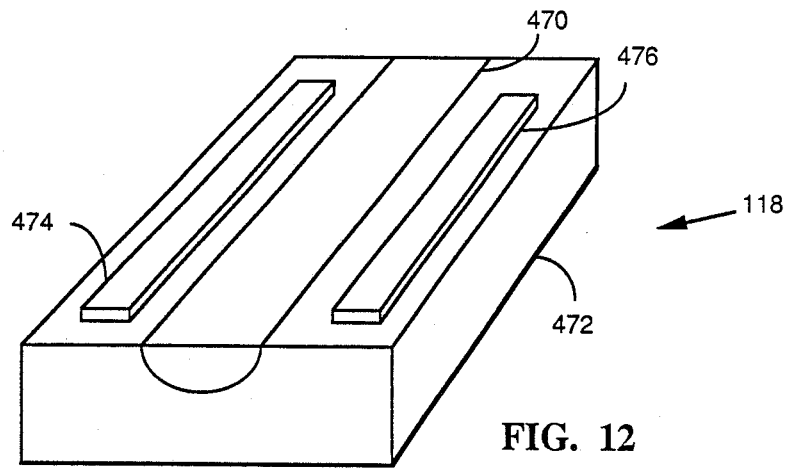
FIG. 12 is a perspective view of the phase modulator of FIGS. 10 and 11.
Figure 10:
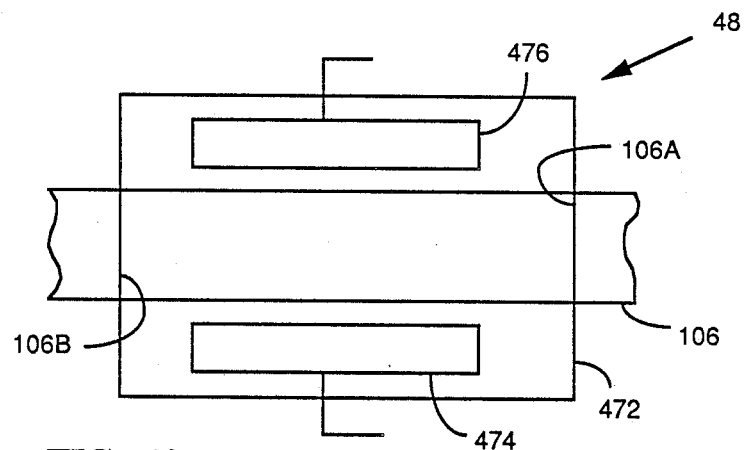
FIG. 10 is plan view of a phase modulator that may be included in the fiber optic gyroscope of FIG. 7.
Figure 11:
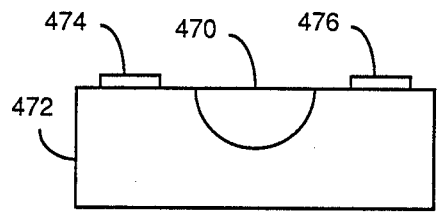
FIG. 11 is an end elevation view of the phase modulator of FIG. 10.

Referring to FIGS. 10-12, the phase modulator 48 may comprise an optical waveguide 470 formed on a substrate 472 of an electrooptically active material such as lithium niobate. A pair of electrodes 474 and 476 are attached to the substrate 472 on opposite sides of the waveguide 470. The electrodes 474 and 476 may be formed on the substrate 472 by vapor deposition of aluminum. The optical waveguide 470 may be formed in the substrate 472 by first depositing a strip of titanium on the substrate 480 and heating it to drive the titanium into the substrate 472. The resulting waveguide 470 has a generally semicircular cross section as shown in FIGS. 11 and 12. The fiber 106 must be cut to have two ends 106A and 106B that are butt coupled to opposite sides of the optical waveguide 470 as shown in FIGS. 7 and 10.

Application of a voltage across the electrodes 474 and 476 changes the refractive index of the optical waveguide 470 by means of the electrooptic effect. The transit time of a light wave through the waveguide 470 is the product of the length of the waveguide and its refractive index divided by the speed of light in vacuum. Changing the refractive index of the optical waveguide 470 thus changes the transit time of an optical signal through it. Because of the sinusoidal nature of the electromagnetic fields that comprise the light wave, the change in transit time is seen as a change in phase of the wave.

Changes in the temperature of the optical signal source change the output wavelength. It is possible to control the wavelength output of the source 15 by controlling its temperature. The base plate 16 is preferably formed of a material that exhibits the Peltier effect and the light source is mounted on the baseplate in thermal contact therewith. The phase change caused by the crystals 20 and 22 opposes the change in phase caused by temperature changes. Therefore using the feedback signal to control the thermoelectric heater the feedback permits control of the source wavelength.

Although the invention is described with reference to an SLD, it may also be used to stabilize a solid state laser. The long coherence length of such lasers permits the crystals to be larger than the dimensions described herein for the short coherence length SLD.

What is claimed is:

1. A fiber optic rotation sensing system, comprising:
   an optical source;
   a first optical fiber for receiving light from the optical source;
   a second optical fiber having a sensing coil formed therein;
   optical coupling means for coupling light between the first and second optical fibers; and
   means for controlling the frequency of an optical signal output from an optical signal source, comprising:
   a first birefringent material positioned to receive an optical signal output from the optical source so that the signal propagates therethrough;
   means for modulating the birefringence of the first birefringent material;
   a second birefringent material positioned to receive the signal output from the first birefringent material;
   detector means for forming an electrical signal indicative of the phase shift produced by the first and second birefringent materials between a pair of orthogonal polarizations in the optical signal received by the first birefringent material; and
   means for processing the electrical signal for adjusting the frequency of the optical signal output from the signal source.

2. The fiber optic rotation sensing system of claim 1, further comprising:
   a first polarizing beam splitter positioned between the optical source and the first birefringent material; and
   a second polarizing beam splitter positioned between the detector means and the second birefringent material.

3. The fiber optic rotation sensing system of claim 2 wherein the modulating means comprises an oscillator electrically coupled to the first birefringent material, the first birefringent material being electrooptically active so that signals from the oscillator change at least one of the refractive indices of the first birefringent material.

4. The fiber optic rotation sensing system of claim 3, further including:
   a mixer connected both to the oscillator and to the detecting means to receive signals therefrom; and
   an amplifier connected to the mixer to receive the mixed oscillator and detector signals.

5. The fiber optic rotation sensing system of claim 3, wherein the first polarizing beamsplitter has a polarization axis oriented at 45° to the principal axes of the first birefringent material and the second polarizing beamsplitter has a polarization axis oriented at 45° to the principal axes of the second birefringent material.

6. The fiber optic rotation sensing system of claim 3, further including means for producing a temperature-independent phase shift between the two polarizations that are input to the first birefringent material and output from the second birefringent material.

7. The fiber optic rotation sensing system of claim 6 wherein the means for producing a temperature-independent phase shift includes a first length $L_1$ of the first birefringent material and a second length $L_2$ of the second birefringent material such that $L_1/L_2 = K_2 B_2 / K_1 B_1$, where $B_1$ and $B_2$ represent the birefringence of the first and second birefringent materials, respectively and $$K_1 = (1/B_1)\, dB_1/dT + (1/L_1)\, dL_1/dT, \text{ and}$$

$$K_2 = (1/B_2)\, dB_2/dT + (1/L_2)\, dL_2/dT,$$

with T representing the temperature of the first and second birefringent materials.

8. The fiber optic rotation sensing system of claim 1, further including means for producing a temperature-independent phase shift between the two polarizations that are input to the first birefringent material and output from the second birefringent material.

9. The fiber optic rotation sensing system of claim 8 wherein the means for producing a temperature-independent phase shift includes a first length $L_1$ of the first birefringent material and a second length $L_2$ of the second birefringent material such that $L_1/L_2=K_2B_2/K_1B_1$, where $B_1$ and $B_2$ represent the birefringence of the first and second birefringent materials, respectively and $$K_1=(1/B_1)\ dB_1/dT+(1/L_i)\ dL_1/dT,\ \text{and}$$

$$K_2=(1/B_2)\ dB_2/dT+(1/L_2)\ dL_2/dT,$$

with T representing the temperature of the first and second birefringent materials.

10. A method for measuring rotations comprising the steps of:
producing a light beam with an optical source;
receiving light from the optical source with a first optical fiber;
forming a sensing coil in a second optical fiber;
coupling light between the first and second optical fibers so that the sensing coil guides a pair of counterpropagating waves; and
controlling the frequency of an optical signal output from the optical signal source, comprising the steps of:
positioning a first birefringent material to receive an optical signal output from the optical source so that the signal propagates therethrough;
modulating the birefringence of the first birefringent material;
positioning a second birefringent material to receive the signal output from the first birefringent material;
forming an electrical signal indicative of the phase shift produced by the first and second birefringent materials between a pair of orthogonal polarizations in the optical signal received by the first birefringent material; and
processing the electrical signal for adjusting the frequency of the optical signal output from the signal source.

11. The method of claim 10, further comprising the steps of:
placing a first polarizing beam splitter between the optical source and the first birefringent material; and
placing a second polarizing beam splitter between the detector means and the second birefringent material.

12. The method of claim 11, further comprising the step of forming the modulating means to comprise an oscillator electrically coupled to the first birefringent material, the first birefringent material being electrooptically active so that signals from the oscillator change at least one of the refractive indices of the first birefringent material.

13. The method of claim 12, further including the steps of:
connecting a mixer both to the oscillator and to the detecting means to receive signals therefrom; and
amplifying the mixed oscillator and detector signals.

14. The method of claim 12, further comprising the steps of arranging the first polarizing beamsplitter to have a polarization axis oriented at 45° to the principal axes of the first birefringent material and arranging the second polarizing beamsplitter to have a polarization axis oriented at 45° to the principal axes of the second birefringent material.

15. The method of claim 14, further comprising the step of producing a temperature-independent phase shift between the two polarizations that are input to the first birefringent material and output from the second birefringent material.

16. The method of claim 15, wherein the step of producing a temperature-independent phase shift includes forming the first birefringent material to have a first length $L_1$ and forming the second birefringent material to have second length $L_2$ such that $L_1/L_2=K_2B_2/K_1B_1$ where $B_1$ and $B_2$ represent the birefringence of the first and second birefringent materials, respectively and $$K_1=(1/B_1)\ dB_1/dT+(1/L_i)\ dL_1/dT,\ \text{and}$$

$$K_2=(1/B_2)\ dB_2/dT+(1/L_2)\ dL_2/dT,$$

with T representing the temperature.

17. A device for controlling the frequency of an optical signal output from an optical signal source, comprising:
a first birefringent material positioned to receive an optical signal output from the optical source so that the signal propagates therethrough;
means for modulating the birefringence of the first birefringent material;
a second birefringent material positioned to receive the signal output from the first birefringent material;
detector means for forming an electrical signal indicative of the phase shift produced by the first and second birefringent materials between a pair of orthogonal polarizations in the optical signal received by the first birefringent material; and
means for processing the electrical signal for adjusting the frequency of the optical signal output from the signal source.

18. A method for controlling the frequency of an optical signal output from an optical signal source, comprising the steps of:
positioning a first birefringent material to receive an optical signal output from the optical source so that the signal propagates therethrough;
modulating the birefringence of the first birefringent material;
positioning a second birefringent material to receive the signal output from the first birefringent material;
forming an electrical signal indicative of the phase shift produced by the first and second birefringent materials between a pair of orthogonal polarizations in the optical signal received by the first birefringent material; and
processing the electrical signal for adjusting the frequency of the optical signal output from the signal source.

* * * * *